United States Patent
Tsotsis

(10) Patent No.: US 6,986,929 B2
(45) Date of Patent: Jan. 17, 2006

(54) COMPOSITE PREFORM STRUCTURAL PANEL HAVING ELECTRICALLY CONDUCTIVE STITCHING

(75) Inventor: Thomas Karl Tsotsis, Orange, CA (US)

(73) Assignee: The Boeing Company, Chicago, IL (US)

(*) Notice: Subject to any disclaimer, the term of this patent is extended or adjusted under 35 U.S.C. 154(b) by 212 days.

(21) Appl. No.: 10/684,606

(22) Filed: Oct. 14, 2003

(65) Prior Publication Data

US 2004/0084103 A1 May 6, 2004

Related U.S. Application Data

(62) Division of application No. 10/235,778, filed on Sep. 5, 2002, now Pat. No. 6,794,012.

(51) Int. Cl.
*B32J 3/06* (2006.01)

(52) U.S. Cl. .................. 428/102; 428/251; 428/922; 428/924; 156/92; 156/93; 244/131; 244/132; 244/133; 244/125; 244/126; 112/439; 361/117

(58) Field of Classification Search .............. 428/102, 428/251, 922, 924; 156/92, 93; 244/131, 244/132, 133, 125, 126; 112/439; 361/117
See application file for complete search history.

(56) References Cited

U.S. PATENT DOCUMENTS

| 4,352,142 A | 9/1982 | Olson |
| 4,479,163 A | 10/1984 | Bannink, Jr. et al. |
| 4,494,165 A | 1/1985 | Maheshwari |
| 4,583,702 A | 4/1986 | Baldwin |
| 4,628,402 A | 12/1986 | Covey |
| 4,755,904 A | 7/1988 | Brick |
| 4,776,160 A | 10/1988 | Rees |
| 5,132,168 A | 7/1992 | Meyn et al. |
| 5,260,124 A | 11/1993 | Gaier |
| 5,542,624 A | 8/1996 | Smith |
| 5,712,449 A | 1/1998 | Miska et al. |
| 5,935,678 A | 8/1999 | Park |
| 2002/0180077 A1 | 12/2002 | Glatkowski et al. |

*Primary Examiner*—Patrick Joseph Ryan
*Assistant Examiner*—Jane Rhee
(74) *Attorney, Agent, or Firm*—Harness Dickey & Pierce P.L.C.

(57) ABSTRACT

A structural panel comprised of a composite preform having an electrically conductive stitching. The stitching forms an electrically conductive grid-like network on the structural panel to better dissipate electrical energy received in a lightning strike throughout at least a portion of the thickness of the composite preform. Advantageously, the electrically conductive stitching is applied to the composite preform during the primary manufacturing process, rather than in a subsequent manufacturing step, to thereby help reduce the overall manufacturing cost of the structural panel. In one alternative embodiment a non-conductive polymer stitching is also applied throughout the entire thickness of the composite preform.

22 Claims, 1 Drawing Sheet

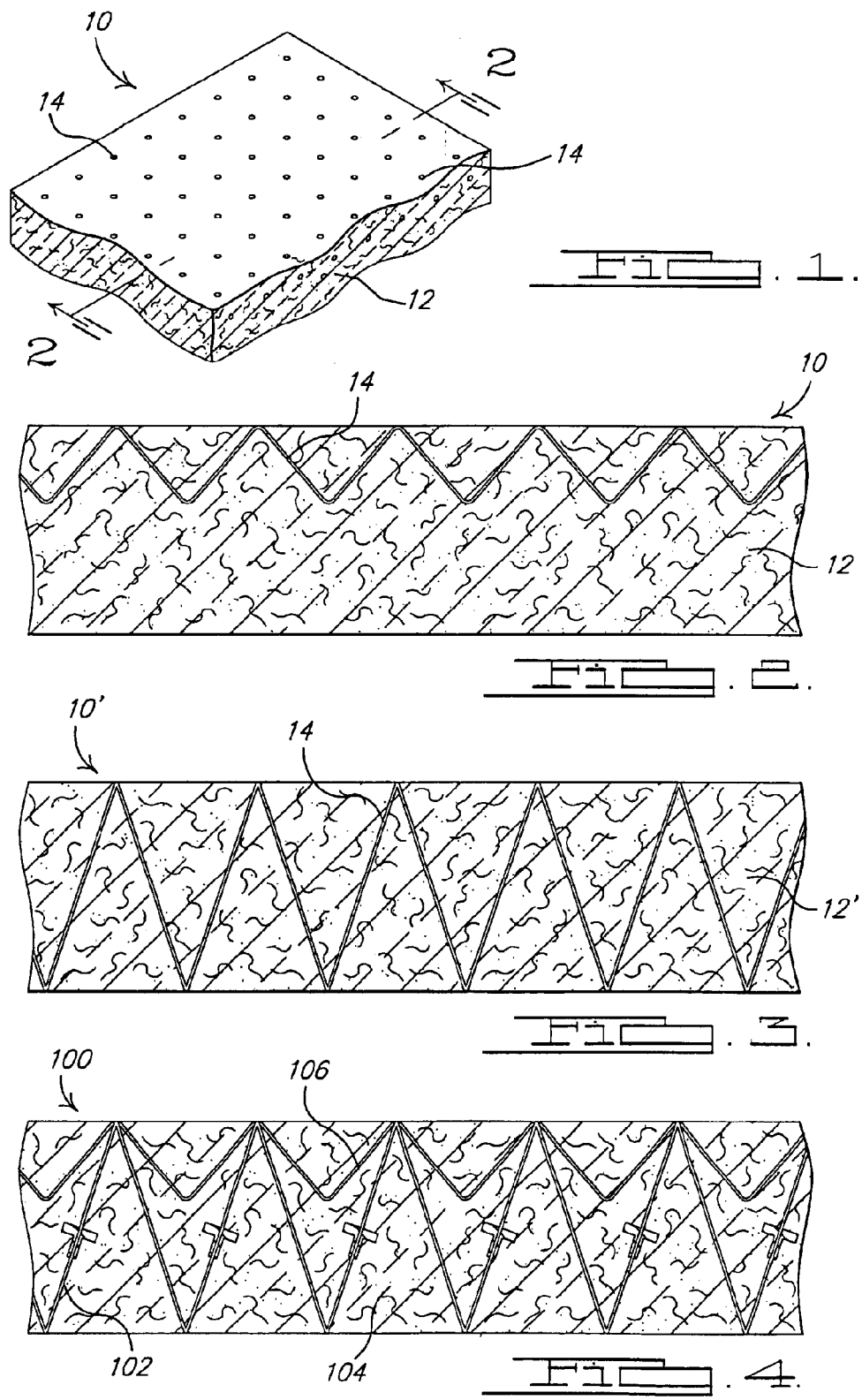

COMPOSITE PREFORM STRUCTURAL PANEL HAVING ELECTRICALLY CONDUCTIVE STITCHING

CROSS-REFERENCE TO RELATED APPLICATIONS

This application is a divisional of U.S. patent application Ser. No. 10/235,778 filed on Sep. 5, 2002, now U.S. Pat. No. 6,794,012, the disclosure of which is incorporated herein by reference.

FIELD OF THE INVENTION

The present invention relates to the construction of composite preform structural panels, and more particularly to a composite preform incorporating an electrically conductive stitching that forms an electrically conductive grid network to dissipate electrical energy received from a lightning strike throughout the thickness of the composite preform structural panel.

BACKGROUND OF THE INVENTION

The ability to effectively deal with lightning strikes on composite materials that form structural panels for wings, fuselages and other components of a primary aircraft structure is anticipated to be an important consideration on newly developed aircraft. This is because composite materials, which are becoming increasingly common in aircraft use, are not highly conductive and cannot readily dissipate the energy from a lightning strike as efficiently as the traditional metal body components used with many present day primary aircraft. Composite materials are nevertheless highly desired because of the significant weight reduction that they can provide, in addition to the very high structural rigidity and strength they offer.

Presently, the solution to providing composite materials with the ability to dissipate electrical energy experienced during a lightning strike has involved coating the composite body panels with coatings such as Astrostrike® or other like materials. Such a solution forms an additional manufacturing step that is required to be performed after the composite preform, that forms the aircraft structural panel, has been completely manufactured. This is obviously more expensive than a solution in which the composite preform forming the structural panel is manufactured to include a means to dissipate electrical energy from a lightning strike.

It would therefore be highly desirable to provide a composite preform structural panel, as well as a manufacturing process, that integrates lightning protection directly into the primary manufacturing process of the composite preform. More specifically, it would be highly desirable to provide a structural panel and method of manufacturing same in which lightning protection is integrated into the primary manufacturing process in a manner that does not significantly increase the overall weight of the finished composite preform, and which does not significantly add to the cost or complexity of the manufacturing process of forming same.

SUMMARY OF THE INVENTION

The above and other objects are provided by a structural panel and method incorporating a stitched, electrically conductive material that is applied to a composite preform during the primary manufacturing process of the composite preform. The apparatus forms a composite preform having electrically conductive stitching that forms a grid-like network for dissipating electrical energy throughout at least a portion of the thickness of the composite preform. In one preferred form, the composite preform includes electrically conductive stitching extending only partially through its thickness. An alternative embodiment incorporates the electrically conductive stitching extending completely through the thickness of the composite preform to opposing surfaces of the composite preform. In yet another preferred form the electrically conductive stitching extends only through a portion of the thickness of the composite preform while a non-conductive polymer stitching extends through the entire thickness of the preform. In either event, the electrically conductive stitching is applied during the primary manufacturing process of forming the structural member.

In each of the preferred embodiments discussed above, the electrically conductive stitching comprises a metal stitching comprised of a metallic thread. In one alternative preferred embodiment suitable for use with fuel tanks and other liquid-containing components, a non-conductive, liquid-crystal polyester stitching is employed as the stitching thread. In one preferred form the non-conductive stitching thread comprises Vectran® liquid-crystal polymer thread.

The apparatus and method of the present invention forms a means to better dissipate the electrical energy imparted to the composite preform during a lightning strike by using the electrically conductive stitching to dissipate the electrical charge throughout at least a portion of the thickness of the composite preform. Since the electrically conductive stitching is applied during the primary manufacturing process for the composite preform, this significantly reduces the cost associated with the manufacture of the composite preform.

Further areas of applicability of the present invention will become apparent from the detailed description provided hereinafter. It should be understood that the detailed description and specific examples are intended for purposes of illustration only and are not intended to limited the scope of the invention.

BRIEF DESCRIPTION OF THE DRAWINGS

The present invention will become more fully understood from the detailed description and the accompanying drawings, wherein:

FIG. 1 is a perspective view of a portion of a structural panel incorporating a composite preform having electrically conductive stitching in accordance with a preferred embodiment of the present invention;

FIG. 2 is a cross-sectional side view taken in accordance with section line 2—2 in FIG. 1 illustrating the uniform arrangement of the electrically conductive stitching used on the composite preform shown in FIG. 1;

FIG. 3 is a cross-sectional side view of an alternative preferred embodiment of the present invention with the electrically conductive stitching extending completely through the thickness of the composite preform; and FIG. 4 illustrates an alternative preferred form of composite preform in which the electrically conductive stitching extends only through a portion of the thickness of the composite preform, and where a non-conductive stitching extends through the entire thickness of the preform to the opposing surfaces of the preform.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, there is shown an exemplary structural panel 10 in accordance with a preferred embodiment of the present invention. The structural panel 10 is suitable for use in a wide variety of aircraft and aerospace applications where an airborne vehicle may experience a lightning strike. However, while the structural panel 10 will immediately be recognized as being highly useful and suitable for use with aircraft and aerospace vehicles, the structural panel 10 is just as readily adapted for use with ground-based vehicles or even ground-based structures wherein the ability to dissipate the energy from a lightning strike over a structural panel is a concern.

With further reference to FIG. 1, the structural panel 10 includes a composite preform 12 having an electrically conductive stitching 14 disposed in the composite preform 12. The electrically conductive stitching 14 is a metallic thread and is applied to the composite preform 12 preferably during the manufacturing of the composite preform either before or subsequent to the infusion of a liquid resin into the composite preform 12. The electrically conductive stitching 14 extends into the composite preform 12 and essentially forms an electrical grid-like structure or network. This grid or network serves to dissipate the electrical charge received during a lightning strike into the thickness of the composite preform 12, and across the entire area of the composite preform 12. Accordingly, there is no need to employ independent materials such as flamed-sprayed aluminum or coatings such as Astrostrike® shielding, as with previously developed composite materials that need to be protected from the effects of a lightning strike. It is a principal advantage of the present invention that the electrically conductive stitching 14 can be readily and economically implemented during the manufacturing of the composite preform 12, thus obviating the need for a subsequent manufacturing step after the composite preform 12 has been fully cured during its manufacturing process.

Referring to FIG. 2, the electrically conductive stitching 14 is shown as penetrating through only a portion of the thickness of the composite preform 12. In an alternative preferred embodiment 10' shown in FIG. 3, electrically conductive stitching 14' is shown extending throughout the entire thickness of the composite preform 12' so as to be exposed on opposing surfaces of the composite preform 12'. Obviously, extending the electrically conductive stitching 14' through the entire thickness of the composite preform 12' serves to provide even more effective use of the entire composite preform in dissipating the electrical charge received during a lightning strike. However, it will be appreciated that through-thickness, electrically conductive stitching will not be implemented in any structural panels used to hold fuel or other combustible fluids.

Referring to FIG. 4, yet another alternative preferred embodiment of a structural panel 100 in accordance with the present invention is shown. The structural panel 100 differs from the structural panel 10 in that non-conductive stitching 102 is used to stitch completely through the thickness of a composite preform 104. Electrically conductive stitching 106, such as metallic thread, is used to stitch through only a portion of the thickness of the composite preform 104. Optionally, out-of-plane, T-shaped or other stiffening elements well known by those of ordinary skill in the art may be incorporated into the composite preform 104 to provide additional structural stiffening.

One suitable non-conductive stitching material is liquid-crystal polymer thread, such as Vectran® polymer stitching thread, available from Celanese AG. In the embodiments of FIGS. 1–4, the electrically conductive stitching 14 or 106 has a preferred diameter within a range of between about 1.5 micrometers–750 micrometers, and more preferably 250–750 micrometers, and most preferably 300–700 micrometers. Preferred materials are 304, 316L and 317L stainless steels, Nickel 200, Copper 11000, Titanium (CP), brass, Hastalloy X, Hastalloy C-22, NiChrome and aluminum. In FIG. 4, the non-conductive stitching 102 preferably comprises denier values between about 200–2400, more preferably between 400 and 1600, and most preferably between about 800–1200.

The use of Vectran® liquid-crystal polymer stitching would be particularly useful for stitching in composite preforms that are to form a portion of a fuel tank. This is because Vectron® liquid-crystal stitching is known to be highly resistant to microcracking along the stitch-thread length when its associated composite preform is infused and cured with epoxy resin. Accordingly, with Vectran® liquid-crystal polymer thread, stitching through the entire thickness of a composite part can readily be implemented even for sensitive component parts needed to hold fuel, water, or other liquids.

An alternative to the use of Vectran® liquid-crystal polymer thread for a component panel that will be used to hold fuel or any other form of liquid would be to simply provide the electrically conductive stitching 14 along a portion of the thickness of the composite preform 12, as shown in FIG. 2. Since the electrically conductive stitching 14 of FIG. 2 does not penetrate the entire thickness of the composite preform 12, it cannot provide a continuous leak path in the rare event that cracking of the stitching 14 occurs.

The structural panel of the present invention thus provides a panel having a means for dissipating electrical energy received from a lightning strike throughout the thickness of the panel. Also importantly, the electrically conductive stitching 14 or 106 is integrated into the composite preform during the primary manufacturing process to thus minimize the overall cost of the finished structural panel.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for forming an electrically conductive composite panel, comprising:

using a composite preform for forming at least a portion of said composite panel;

disposing an electrically conductive thread through at least a portion of a total thickness of said composite preform; and arranging said thread such that said thread forms an electrically conductive grid over at least a portion of said composite preform and a non-conductive stitching extending entirely through an entire thickness of said composite perform.

2. The method of claim 1, wherein said electrically conductive thread is stitched to said composite preform.

3. The method of claim 1, wherein the step of disposing an electrically conductive thread comprises disposing a metallic thread throughout said portion of said composite preform.

4. The method of claim 1, wherein the electrically non-conductive, thread is formed by a liquid-crystal polymer thread.

5. The method of claim 1, wherein the step of disposing said electrically conductive thread comprises stitching said electrically conductive thread completely through a thickness of said composite preform.

6. A method for forming an electrically conductive composite panel, comprising:

using a composite preform for forming at least a portion of said composite panel;

stitching said composite preform with an electrically conductive thread such that said stitching penetrates at least partially through a thickness of said composite preform; and arranging said stitching such that said stitching forms an electrically conductive grid over at least a portion of said composite preform; and a non-conductive stitching extending entirely through an entire thickness of said composite perform.

7. The method of claim 6, wherein said stitching comprises stitching said composite preform with a metallic thread.

8. The method of claim 6, further comprising stitching said composite preform with a non-conductive, liquid-crystal polymer thread.

9. The method of claim 6, wherein said stitching is performed to completely penetrate opposing surfaces of said composite preform.

10. A method for dispersing an electrical charge from a lightning strike over a composite body panel of an aircraft, comprising:

stitching said composite body panel with an electrically conductive thread such that said stitching forms an electrically conductive grid over at least a portion of said composite body panel; and using said electrically conductive grid to channel said electrical charge into said composite body panel to thereby disperse and absorb said electrical charge; and a non-conductive stitching extending entirely through an entire thickness of said composite perform.

11. The method of claim 10, wherein said step of stitching comprises stitching said composite body panel during a manufacture of said composite body panel with a metallic thread.

12. The method of claim 10, further comprising stitching said composite body panel with a non-conductive, polymer thread.

13. The method of claim 10, wherein said step of stitching comprises stitching said composite body panel such that said electrically conductive thread extends through opposing surfaces of said composite body panel.

14. A method of dissipating electrical energy impinging a composite panel, comprising:

forming an electrically conductive grid on said composite panel with a metallic stitching; and applying said metallic stitching such that said stitching penetrates through at least a portion of a thickness of said composite panel; and using said metallic stitching to help distribute and dissipate said electrical energy over a significant portion of said composite panel; and a non-conductive stitching extending entirely through an entire thickness of said composite perform.

15. The method of claim 14, wherein applying said metallic stitching comprises applying said metallic stitching such that said metallic stitching extends through an entire thickness of said composite panel and through opposing surfaces of said composite panel.

16. The method of claim 14, further comprising stitching said composite panel with an electrically non-conductive, polymer thread.

17. The method of claim 14, wherein applying said metallic stitching comprises applying said metallic stitching in a generally uniform pattern over said composite panel.

18. The method of claim 16, further comprising stitching said composite panel with said electrically non-conductive, polymer thread in a generally uniform pattern.

19. The method of claim 18, further comprising stitching said electrically non-conductive polymer in a pattern so as to overlap said metallic stitching.

20. A method of forming a composite panel able to dissipate electrical energy impinging thereon, comprising:

stitching said composite panel with an electrically conductive material such that said electrically conductive material extends at least partially through a thickness of said composite panel and forms a first grid on said composite panel; and stitching said composite panel with an electrically non-conductive material extending entirely through an entire thickness of said composite panel and forms a second grid on said composite panel.

21. The method of claim 20, wherein the step of stitching said composite panel with said electrically non-conductive material comprise stitching said composite panel with a polymer thread.

22. The method of claim 20, wherein the step of stitching said composite panel with said electrically conductive material comprises stitching said composite panel with a metallic thread.

* * * * *